(12) United States Patent
Shoji et al.

(10) Patent No.: US 8,401,359 B2
(45) Date of Patent: Mar. 19, 2013

(54) VIDEO RECEIVING APPARATUS AND VIDEO RECEIVING METHOD

(75) Inventors: Takuro Shoji, Tokyo (JP); Akira Nishiyama, Kanagawa (JP)

(73) Assignee: Sony Corporation (JP)

( * ) Notice: Subject to any disclaimer, the term of this patent is extended or adjusted under 35 U.S.C. 154(b) by 1290 days.

(21) Appl. No.: 11/890,298

(22) Filed: Aug. 3, 2007

(65) Prior Publication Data

US 2008/0317440 A1    Dec. 25, 2008

(30) Foreign Application Priority Data

Aug. 21, 2006   (JP) ................. 2006-224775

(51) Int. Cl.
*H04N 5/765*   (2006.01)
*H04N 7/12*    (2006.01)
*H04N 9/80*    (2006.01)
*H04N 17/00*   (2006.01)
*H04N 7/00*    (2011.01)
*H04N 7/16*    (2011.01)
*H03M 7/00*    (2006.01)
*H04J 3/06*    (2006.01)
*H04L 12/28*   (2006.01)

(52) U.S. Cl. .......... 386/200; 386/239; 341/50; 348/180; 348/423.1; 348/460; 348/473; 348/476; 370/395.62; 370/503; 375/240.28; 713/400; 725/151

(58) Field of Classification Search ................. 386/200, 386/239, E9.001; 341/50; 348/180, 423.1, 348/460, 473, 476, E5.021, E5.108, E5.123, 348/E7.031; 370/395.62, 503; 375/240.28, 375/E7.024; 713/400; 725/151
See application file for complete search history.

(56) References Cited

U.S. PATENT DOCUMENTS

| 5,905,525 A | 5/1999 | Ishibashi et al. |
| 5,978,015 A | 11/1999 | Ishibashi et al. |
| 6,141,693 A * | 10/2000 | Perlman et al. ............... 709/236 |

(Continued)

FOREIGN PATENT DOCUMENTS

| JP | 08-126031 A | 5/1996 |
| JP | 09-027970 A | 1/1997 |

(Continued)

OTHER PUBLICATIONS

European Search Report, EP 07114611, dated Dec. 17, 2009.

(Continued)

*Primary Examiner* — Thai Tran
*Assistant Examiner* — Syed Hasan
(74) *Attorney, Agent, or Firm* — Lerner, David, Littenberg, Krumholz & Mentlik, LLP

(57) ABSTRACT

A video receiving apparatus having an input terminal to receive pixel-based video data transmitted with pixel clock synchronized with the video data is provided. The video receiving apparatus may include a separation unit, an information acquisition unit, and a determination unit. The separation unit may be configured to separate auxiliary data added to the video data from the video data obtained at the input terminal. The information acquisition unit may be configured to acquire information on the number of horizontal pixels and the number of vertical pixels for the input video data from the auxiliary data separated at the separation unit. The determination unit may be configured to determine a type of the input video data based on the information on the number of horizontal pixels and the number of vertical pixels that is obtained at the information acquisition unit.

5 Claims, 7 Drawing Sheets

U.S. PATENT DOCUMENTS

| | | | |
|---|---|---|---|
| 6,914,637 B1 * | 7/2005 | Wolf et al. | 348/473 |
| 7,792,152 B1 * | 9/2010 | Xu et al. | 370/503 |
| 2006/0001554 A1 * | 1/2006 | Morishita | 341/50 |

FOREIGN PATENT DOCUMENTS

| | | |
|---|---|---|
| JP | 09-185009 A | 7/1997 |
| JP | 9-214913 A | 8/1997 |
| JP | 2000-172243 A | 6/2000 |
| JP | 2000-232630 A | 8/2000 |
| JP | 2002-032069 A | 1/2002 |
| JP | 2003-044024 A | 2/2003 |
| JP | 2006-019890 A | 1/2006 |
| JP | 2007-288407 A | 11/2007 |
| WO | 03/058946 A2 | 7/2003 |
| WO | 2004-107746 A | 12/2004 |

OTHER PUBLICATIONS

Communication pursuant to Article 94 (3) EPC, from EP Application No. 07114611.2, dated Oct. 2, 2012.

HDMI Licensing, LLC "High-Definition Multimedia Interface, Specification Version 1.3" Jun. 22, 2006, Retrieved from the Internet: URL:https://engineering.purdue.edu/ece477/Webs/s12-Grp10/Datasheets/CEC_HDMI_Specification.pdf [retrieved on Sep. 20, 2012].

* cited by examiner

FIG. 8

| Number of Horizontal Pixels | Number of Vertical Pixels | Minimum Vertical Frequency | Maximum Vertical Frequency | | Signal Type |
|---|---|---|---|---|---|
| 1440, | 240, | 55Hz, | 64Hz, | -> | 480i |
| 1440, | 288, | 46Hz, | 55Hz, | -> | 575i |
| 720, | 480, | 55Hz, | 64Hz, | -> | 480p |
| 720, | 576, | 46Hz, | 55Hz, | -> | 575p |
| 1920, | 540, | 55Hz, | 64Hz, | -> | 1080/60i |
| 1920, | 540, | 46Hz, | 55Hz, | -> | 1080/50i |
| 1280, | 720, | 55Hz, | 93Hz, | -> | 720/60p |
| 1280, | 720, | 46Hz, | 55Hz, | -> | 720/50p |
| 1920, | 1080, | 55Hz, | 93Hz, | -> | 1080/60p |
| 1920, | 1080, | 46Hz, | 55Hz, | -> | 1080/50p |
| 1920, | 1080, | 23Hz, | 25Hz, | -> | 1080/24p |

FIG. 9

| Number of Horizontal Pixels | Number of Vertical Pixels | Minimum Vertical Frequency | Maximum Vertical Frequency | | Signal Type |
|---|---|---|---|---|---|
| 640, | 480, | 46Hz, | 93Hz, | -> | 640x480 |
| 800, | 600, | 46Hz, | 93Hz, | -> | 800x600 |
| 832, | 624, | 46Hz, | 93Hz, | -> | 832x624 |
| 1024, | 768, | 46Hz, | 93Hz, | -> | 1024x768 |
| 1280, | 768, | 46Hz, | 93Hz, | -> | 1280x768 |
| 1400, | 1050, | 46Hz, | 93Hz, | -> | 1400x1050 |
| 1600, | 1200, | 46Hz, | 93Hz, | -> | 1600x1200 |

VIDEO RECEIVING APPARATUS AND VIDEO RECEIVING METHOD

CROSS-REFERENCE TO RELATED APPLICATIONS

This application claims priority from Japanese Patent Application No. JP 2006-224775 filed in the Japanese Patent Office on Aug. 21, 2006, the entire content of which is incorporated herein by reference.

BACKGROUND OF THE INVENTION

1. Field of the Invention

The present invention relates to a video receiving apparatus and a video receiving method, which are suitable for being applied to a digital video/audio I/O interface standard referred to as the HDMI (High-Definition Multimedia Interface) standard.

2. Description of the Related Art

Lately, the HDMI standard has been developed as an interface standard to transmit uncompressed digital video data and the like between a plurality of video apparatuses. According to the HDMI standard, video data is transmitted as individual primary color data respectively transmitted based on a pixel. In the HDMI standard, audio data is also transmitted using a transmission line for video data in a blanking period of the video data. Red, green and blue (R-data, G-data, and B-data) of additive primary color data on three channels are transmitted. Alternatively, luminance and color-difference signals such as Y, Cb and Cr may be transmitted.

Data of respective colors basically includes eight bits in one pixel. Synchronization signals such as a horizontal synchronization signal and a vertical synchronization signal are also transmitted at a timing that each synchronization signal is arranged. A transmission line for pixel clock of video data and a transmission line for control data are also provided.

As described above, according to the HDMI standard, pixel-based video data is transmitted for each color, in which the number of pixels in one frame and a frame frequency are not limited to specific types. Therefore, a frame frequency of input video data or the like may need to be detected in a receiving apparatus that receives video data output from a video transmission apparatus through an HDMI standard cable and that performs reception processing in sync with the detected frame frequency and the like.

FIG. 1 is a schematic diagram showing a processing example of determining the type of input video data in an apparatus to receive the video data using a standard of related art. A signal received at a terminal (hereinafter, the terminal is referred to as an HDMI terminal in this specification) 1, to which a cable of the HDMI standard is connected, is supplied to an HDMI information acquisition unit 2 where the signal multiplexed on each line is separated, and the separated signal is supplied to a signal detection unit 3. Also, clock signal and synchronization signal components in the received signal obtained at the HDMI terminal 1 are supplied to a synchronization frequency analysis unit 4 so that the synchronization frequency is analyzed through processing of counting the clock signal and the like. Information on the analyzed synchronization frequency is supplied to the signal detection unit 3, in which the information is used for determining a type of the video signal.

FIG. 2 is a flow chart indicating an example of signal detection processing of related art which is performed at the signal detection unit 3 and peripheral circuits of the signal detection unit 3 with the configuration shown in FIG. 1. First, upon a signal input into the HDMI terminal 1, it is determined whether the input signal is in such a state that frequency information thereof can be received stably (step S1). When it is determined that a signal is in a stable state, the signal type is determined from the information included in the received signal (step S2). Subsequently, a supplied clock signal is analyzed at the synchronization frequency analysis unit 4 in order to determine whether the frequency is within a preset acquisition range (step S3). In the case of detecting the frequency out of the acquisition range, it is determined that there is no signal input or the signal is out of the range, and video data is not output from the signal detection unit 3. In the case where the frequency is detected to be within the acquisition range at step S3, the type of the received video signal is determined using the clock signal frequency that is analyzed at the synchronization frequency analysis unit 4 and AVI information that is guide information included in the received signal. The video signal obtained at the HDMI terminal 1 is digital video data (DTV signal), and the digital video data of the determined type is supplied to a processing system at a stage subsequent to the signal detection unit 3.

WO2002/078336 discloses details of the HDMI standard.

SUMMARY OF THE INVENTION

The type of video data input into the HDMI terminal can be determined by performing the processing shown in the flow chart of FIG. 2 with the configuration shown in FIG. 1. However, the number of horizontal pixels and the number of vertical pixels per frame are detected by actually counting them for the received signal in the above-described configuration of related art, and therefore, a detection configuration may be complicated and a certain load on detection processing may be required.

Moreover, the HDMI standard is a standard obtained by improving a video data transmission standard of DVI (Digital Visual Interface) for a computer monitor, but there is no direct compatibility between the HDMI standard and the DVI standard although transmission data formats are similar to each other. As a result, in order that a television receiver of related art supports, for example, both of the HDMI standard and DVI standard, a device configuration is complicated since it is necessary to provide both a terminal for the HDMI standard and a terminal for the DVI standard.

It may be desirable to determine more easily the type and others of input video data in the case of providing a terminal of such a standard as the HDMI standard to transmit pixel-based video data.

According to an embodiment of the present invention, in the case where pixel-based transmitted video data is received at a receiving terminal with pixel clock synchronized with the video data, auxiliary data added to the video data may be separated from the video data obtained at an input terminal. Subsequently, information on the number of horizontal pixels and the number of vertical pixels for the input video data may be obtained from the separated auxiliary data. Further, the type of the input video data may be determined based on the obtained information on the number of horizontal pixels and the number of vertical pixels.

As described above, information on the number of horizontal pixels and the number of vertical pixels in the auxiliary data included in the input video data may be used to directly determine the type of the video data.

According to an embodiment of the present invention, the type of video data may be determined directly, using information on the number of horizontal pixels and the number of vertical pixels in auxiliary data included in input video data.

Therefore, there may be no need to count the number of horizontal and vertical pixels so that the type of the input video data can be determined with fast and simplified processing.

BRIEF DESCRIPTION OF THE DRAWINGS

FIG. 8 is an explanatory diagram showing an example of determining a DTV signal according to an embodiment of the present invention; and FIG. 9 is an explanatory diagram showing an example of determining a PC signal according to an embodiment of the present invention.

DETAILED DESCRIPTION

Hereinafter, an embodiment of the present invention is explained by referring to FIGS. 3 through 9.

Figure 1:
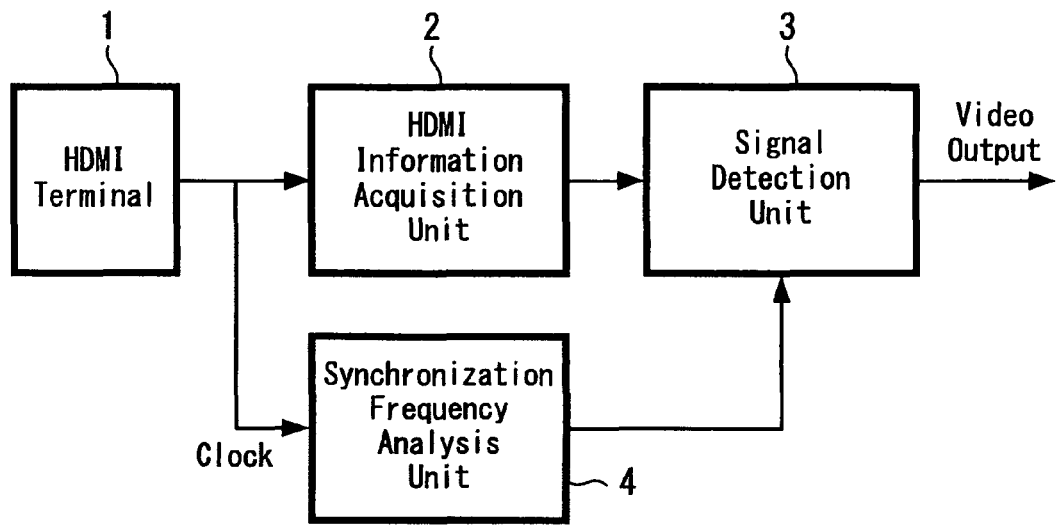
FIG. 1 is a block diagram showing an example of a configuration for signal detection in related art.
Figure 2:
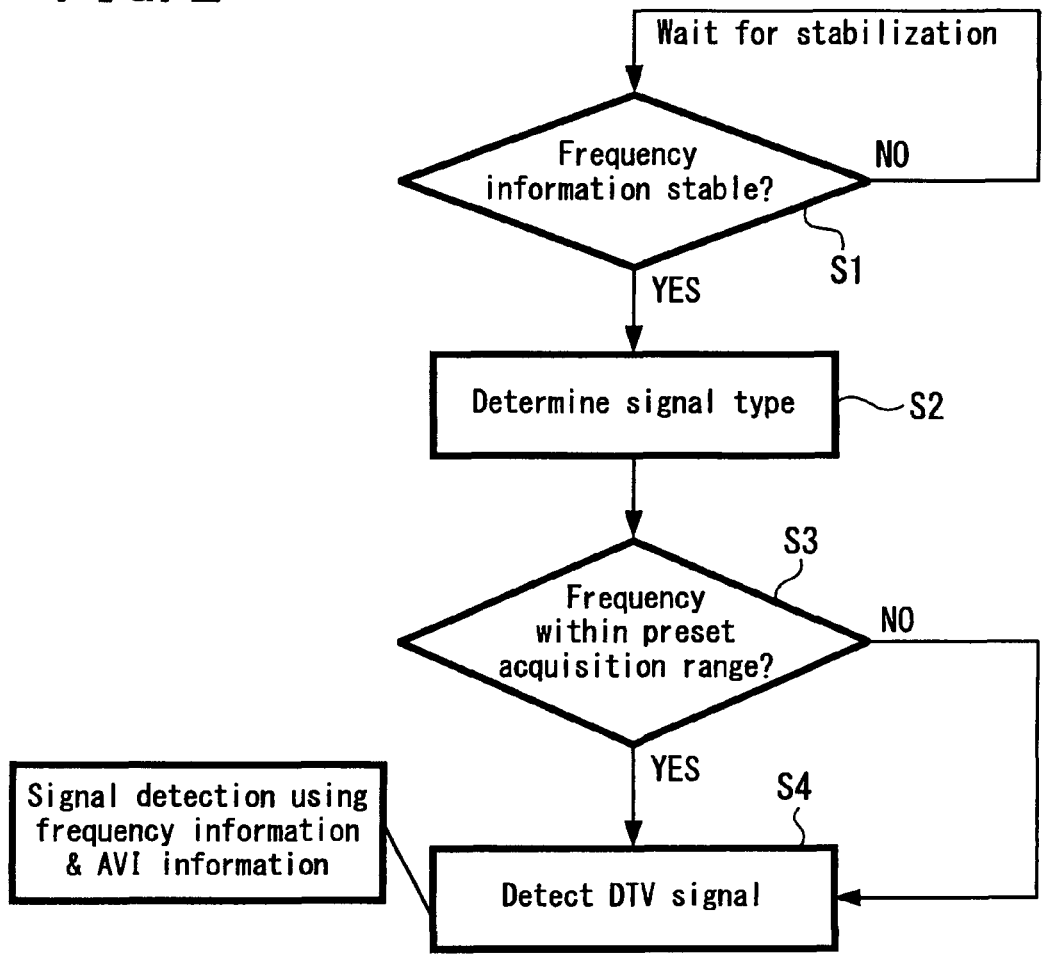
FIG. 2 is a flow chart indicating an example of signal detection processing in related art.
Figure 3:
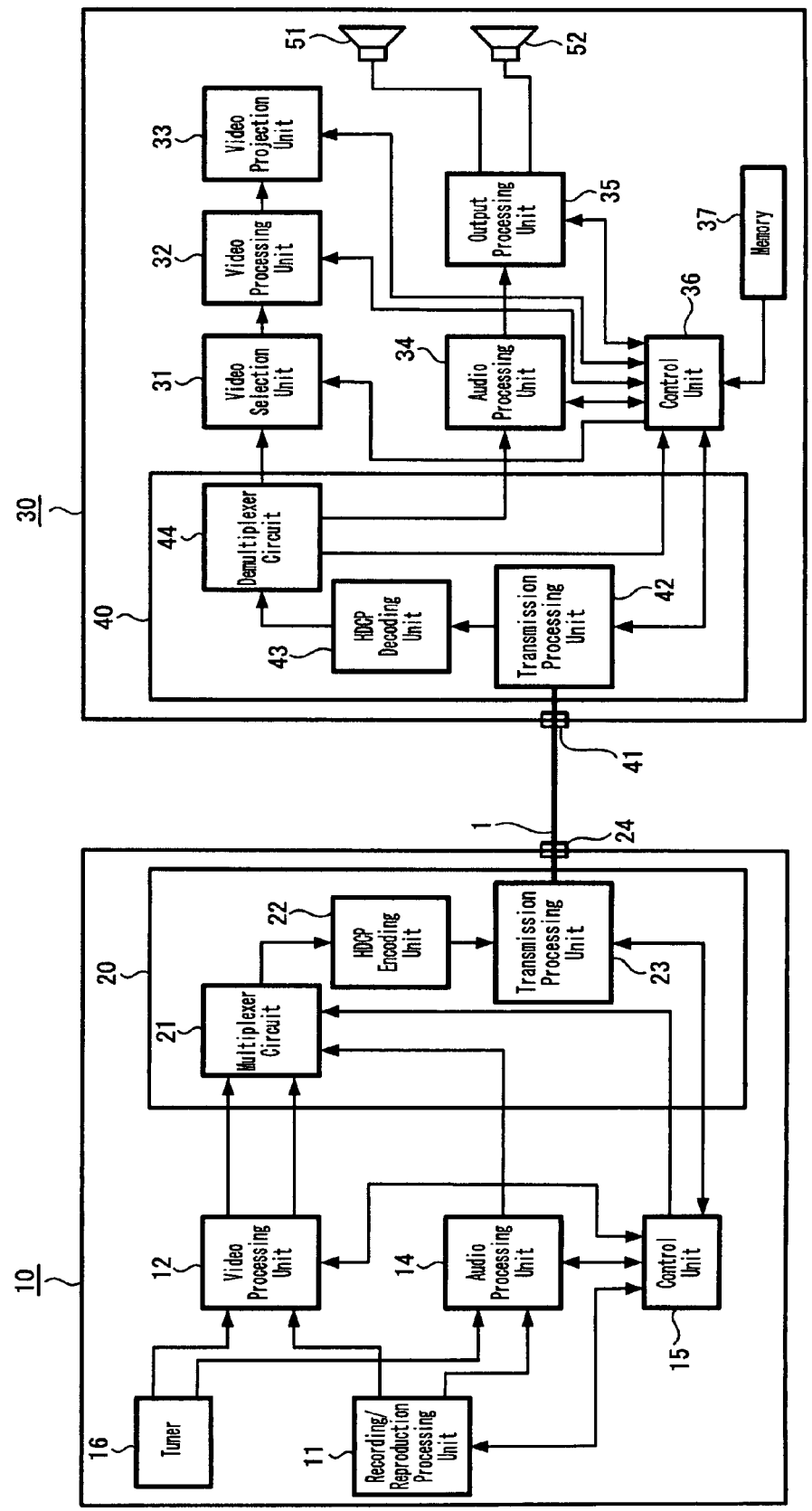
FIG. 3 is a block diagram showing an example of a system configuration according to an embodiment of the present invention.

The embodiment is applied to a transmission system in which video data and the like are transmitted from a source device to a sink device based on the HDMI standard. FIG. 3 is a diagram showing an example of a system configuration according to the embodiment. The system includes a video recording-reproduction apparatus 10 that is a source device and a projector apparatus 30 that is a sink device which are connected using an HDMI cable 1 so that the video data and audio data are transmitted from the video recording-reproduction apparatus 10 to the projector apparatus 30. Other video devices to transmit (output) video data than the video recording-reproduction apparatus 10 can be applied as a source device, and other video devices such as a television receiver to receive (input) video data can be applied as a sink device.

In addition, a device having an output terminal of the DVI standard, which is a video data output standard for a monitor provided with a personal computer apparatus, is also applicable as a source device in this embodiment. In the case where a device having the output terminal of the DVI standard is used as a source device, a cable having a plug at one end connectable to a terminal of the DVI standard and a plug at the other end connectable to the terminal of the HDMI standard is prepared as the HDMI cable 1. A specific example of processing in the case where video data output from the terminal of the DVI standard is input to the projector apparatus 30 will be later described.

First, the video recording-reproduction apparatus 10 is explained. The video recording-reproduction apparatus 10 includes a recording/reproduction unit 11 so that video data and audio data can be recorded and reproduced. A hard disk drive (HDD) apparatus can be used as the recording/reproduction unit 11, for example. Video data obtained from the reproduction performed at the recording/reproduction unit 11 is supplied to a video processing unit 12, and audio data obtained from the reproduction is supplied to an audio processing unit 14. Further, the video recording-reproduction apparatus 10 includes a tuner 16, and video data and audio data received and obtained by the tuner 16 are supplied to the video processing unit 12 and the audio processing unit 14.

The video processing unit 12 performs processing of obtaining transmission video data from reproduced or received video data. The audio processing unit 14 performs processing of obtaining transmission audio data from reproduced or received audio data.

Video data and audio data output from the video processing unit 12 and the audio processing unit 14 are supplied to an HDMI transmission processing unit 20. The HDMI transmission processing unit 20 is an integrated circuit unit, for example, that performs transmission processing of the HDMI standard interface. Video data and audio data supplied to the HDMI transmission processing unit 20 are multiplexed in a multiplexer circuit 21.

Transmission data multiplexed in the multiplexer circuit 21 is encoded at an HDCP encoding unit 22. The HDCP encoding unit 22 encodes at least a channel transmitting the video data based on the HDCP (High-bandwidth Digital Content Protection System) standard.

Data encoded at the HDCP encoding unit 22 is supplied to a transmission processing unit 23, in which pixel data of each color is arranged in an individual channel. A pixel clock channel, a control data channel and the like are prepared corresponding thereto, and thereafter the processed data is transmitted to the HDMI cable 1 connected to an HDMI terminal 24. The HDMI cable 1 is connected to an HDMI terminal 41 of the projector apparatus 30.

Next, a configuration of the projector apparatus 30 is explained. Data transmitted through the HDMI cable 1 connected to the HDMI terminal 41 is detected (received) in sync with pixel clock at a transmission processing unit 42 included in an HDMI transmission processing unit 40. Detected data on each channel is decoded at an HDCP decoding unit 43 from the encoding at the time of transmission. The decoding is here performed eight bits at a time for each channel.

Decoded data is supplied to a demultiplexer circuit 44, in which data multiplexed on each channel is separated. Here, audio data arranged in a blanking period of a video transmitting channel is separated from video data. Further, in the case where data arranged in the blanking period is auxiliary data such as control data and supplementary information, such control data and supplementary information are retrieved.

Video data separated in the demultiplexer circuit 44 is supplied to a video selection unit 31. The video selection unit 31 selects any of the input video data based on a command given from a control unit 36 of the projector apparatus 30 and supplies the selected video data to a video processing unit 32. It should be noted that other video input units than the HDMI terminal 41 are not shown in FIG. 3. The video processing unit 32 performs processing necessary for supplied video data, and the processed video data is supplied to a video projection unit 33. Video to be projected on a separate screen (not illustrated) is prepared at the video projection unit 33. Specifically, light emitted from a light source, for example, is transmitted through a liquid crystal panel so that the light is made into projection light corresponding to video displayed on the liquid crystal panel, and the projection light is projected on the screen through an optical system such as a lens.

Audio data separated in the demultiplexer circuit 44 is supplied to an audio processing circuit 34 in which audio processing such as an analogue conversion is performed, and a processed output signal is supplied to an output processing unit 35. The output processing unit 35 performs processing such as an amplification for speaker drive, and processed audio data is output from a plurality of speakers 51 and 52 connected to the output processing unit 35.

Auxiliary data such as control data separated in the demultiplexer circuit 44 is supplied to the control unit 36. It should be noted that control data such as a command to control the source device can also be transmitted from the control unit 36 in the projector apparatus 30 to a control unit 15 in the video recording-reproduction apparatus 10 using the control data channel.

The control unit 36 is a central processing unit (CPU) that controls an operation of each unit of the projector apparatus 30. The control unit 36 also controls the data transmission at the HDMI terminal 41. Data necessary for the control performed by the control unit 36 is stored in a memory 37. Data indicating details of the signal type of data received at the HDMI terminal 41 is prepared as the data stored in the memory 37. A detailed example of the signal type is later described.

Figure 4:
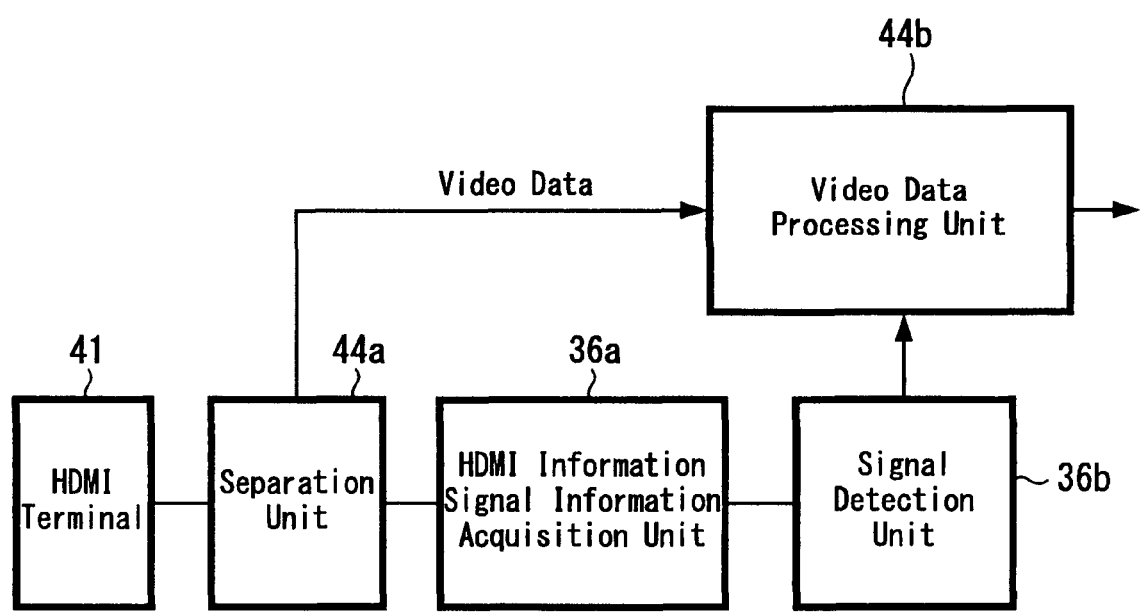
FIG. 4 is a block diagram showing an example of a configuration for signal detection according to an embodiment of the present invention.

FIG. 4 is a block diagram showing a configuration for determining a signal received at the HDMI terminal 41 in view of the signal processing function based on the control of the control unit 36. A signal received at the HDMI terminal 41 is separated at a separation unit 44a included in the demultiplexer circuit 44 (FIG. 3). The separated video data is supplied to a video data processing unit 44b included in the demultiplexer circuit 44, to be supplied to a circuit at a subsequent stage.

Auxiliary data and various control data separated at the separation unit 44a are acquired at a signal information acquisition unit 36a by extracting the data from positions where the respective data are arranged. The acquired data is determined at a signal detection unit 36b. It should be noted that the signal information acquisition unit 36a and the signal detection unit 36b respectively perform processing as the control function included in the control unit 36, however dedicated processing circuits may be provided for the units 36a and 36b. Further, a control unit to perform control processing related to the signal reception at the HDMI terminal may be included in the HDMI transmission processing unit 40.

Next, configuration of data transmitted between the HDMI terminals of connected devices is explained.

Figure 5:
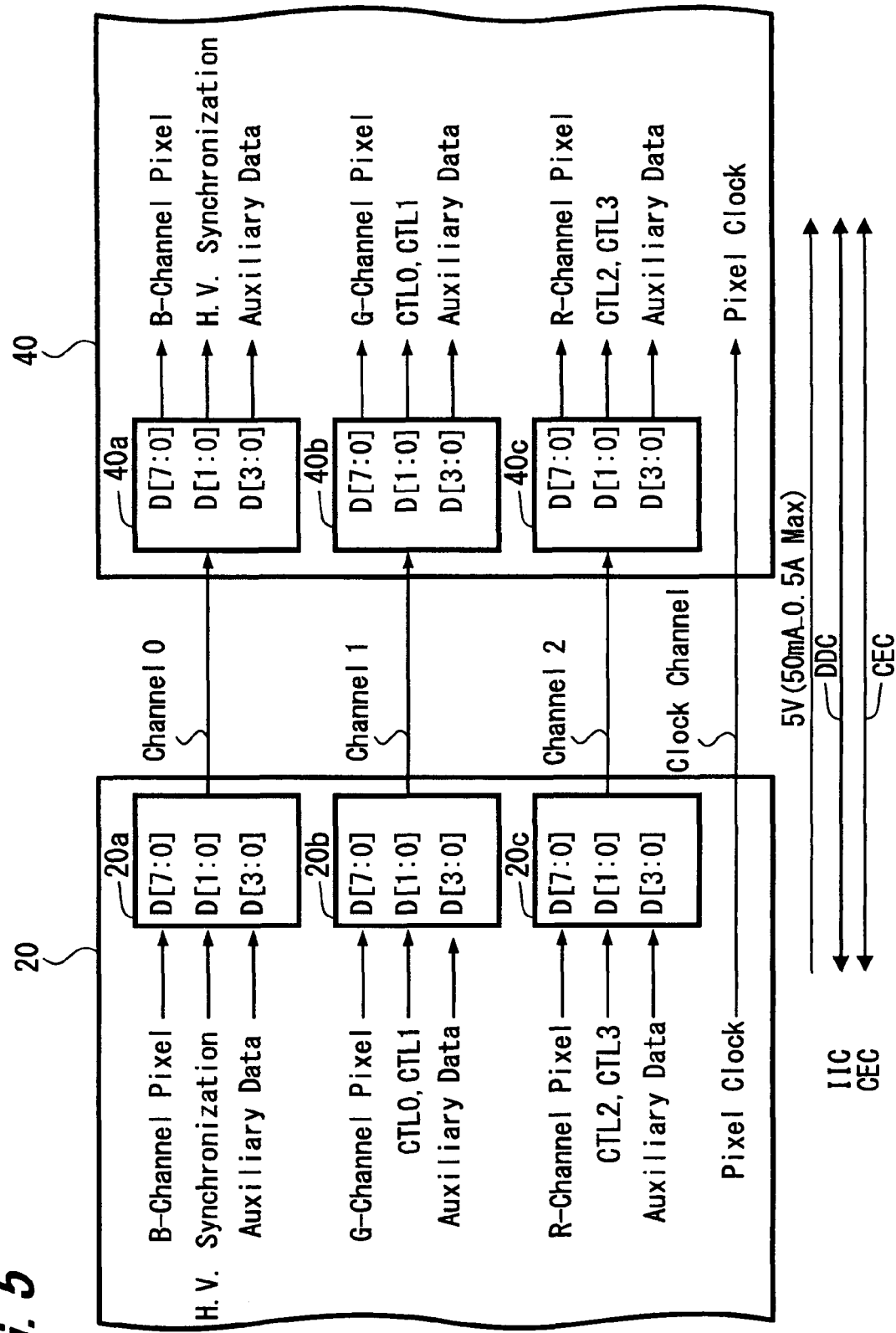
FIG. 5 is an explanatory diagram showing an example of a transmission channel configuration according to an embodiment of the present invention.

FIG. 5 is a diagram showing an example of data configuration on each channel transmitted using the HDMI cable 1 between the transmission processing unit 23 of the video recording-reproduction apparatus 10 and the transmission processing unit 42 of the projector apparatus 30. As shown in FIG. 5, channel 0, channel 1 and channel 2 for transmitting video data are prepared, and further a clock channel to transmit pixel clock is prepared. In addition, a DDC (Display Data Channel) line and CEC (Consumer Electronics Control) line are prepared as control data transmission channels. Further, a line for transmitting DC voltage of 5V or less from a source device to a sink device are also provided.

The transmission processing unit 20 on the transmission side includes transmission processing units (transmitting units) 20a, 20b and 20c prepared for respective channels for transmitting video data, and the transmission processing unit 40 on the receiving side includes transmission processing units (data receiving units) 40a, 40b and 40c prepared for respective channels for transmitting video data.

A configuration of each channel is herein explained. The channel 0 is configured to transmit pixel data of B-data (blue data), vertical synchronization data, horizontal synchronization data and auxiliary data. The channel 1 is configured to transmit pixel data of G-data (green data), two kinds of control data (CTL0, CTL1) and auxiliary data. The channel 2 is configured to transmit pixel data of R-data (red data), two kinds of control data (CTL2, CTL3) and auxiliary data.

Figure 6:
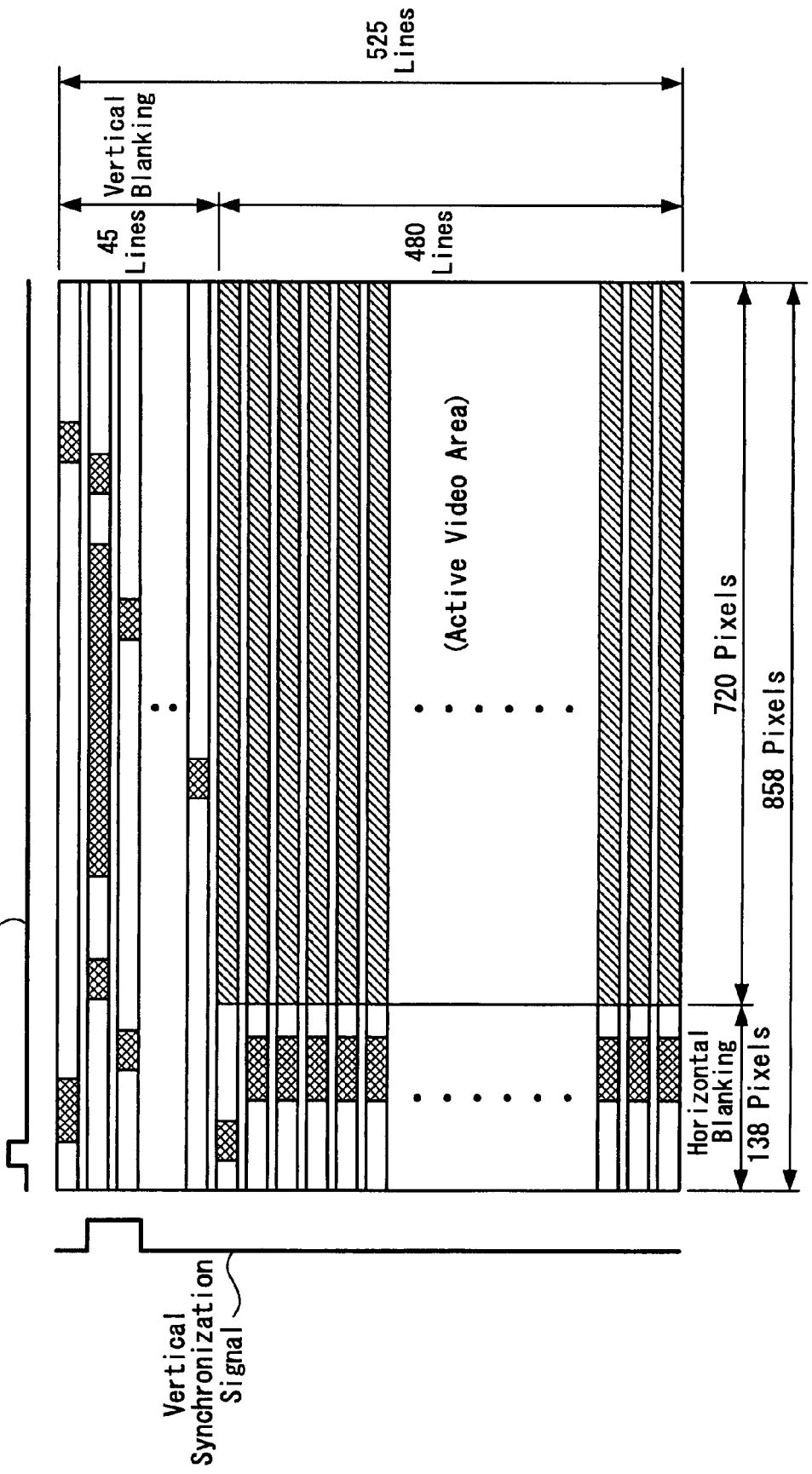
FIG. 6 is an explanatory diagram showing an example of a bit configuration according to an embodiment of the present invention.

FIG. 6 is a diagram showing a line configuration and a pixel configuration of one frame which is transmitted according to the embodiment. Video data (main video data) transmitted in this embodiment is uncompressed data to which a vertical blanking period and a horizontal blanking period are added. Specifically, FIG. 6 shows an example of pixel data of 480 lines×720 pixels set as a video area displayed (shown as an active video area), and 525 lines×858 pixels are set as the number of lines and pixels including the blanking periods, respectively. An area shown with double hatching (with left and right diagonal lines) in the blanking period is referred to as a data island to which the auxiliary data can be added.

The example shown in FIG. 6 includes 480 lines×720 pixels (more specifically, 480 pixels in the vertical direction and 720 pixels in the horizontal direction) in one frame, however data of other frame configuration having other number of pixels than the example can also be transmitted. In any of the cases, the vertical blanking period and the horizontal blanking period, to which auxiliary data is added, are added to the frame.

As the auxiliary data added to the blanking period, there is information as follows, for example.

AVI information includes signal information such as the number of total pixels in the horizontal direction (H Total), the number of total pixels in the vertical direction (V Total), the number of video pixels in the horizontal direction (H Resolution), the number of video pixels in the vertical direction (V Resolution), vertical and horizontal polarities, and pixel clock. Further, HDMI information includes mode information, color space information, repetition information, identification flag, check code (CRC), aspect ratio information, wide mode information, and the like.

Figure 7:
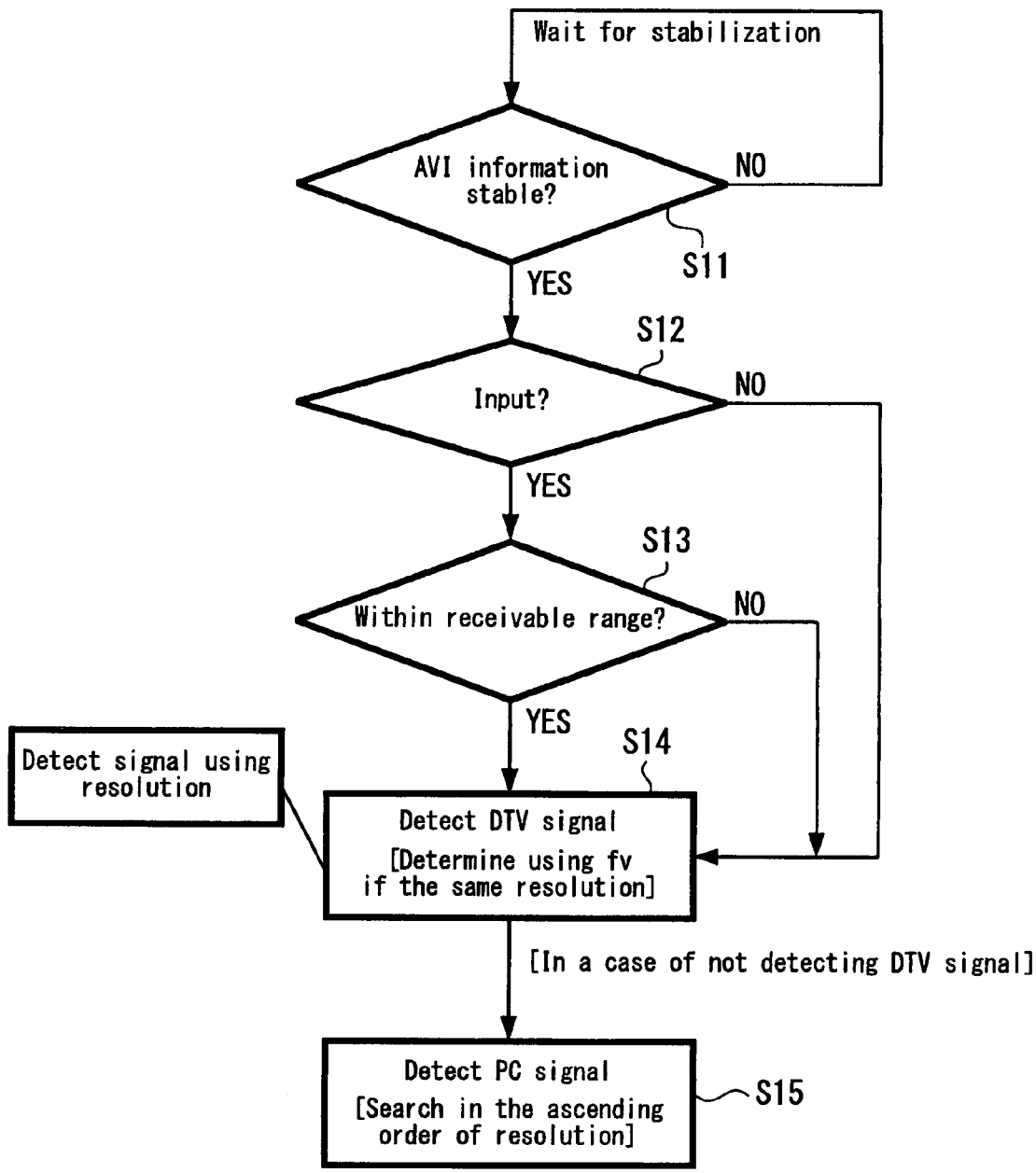
FIG. 7 is a flow chart indicating an example of detection processing according to an embodiment of the present invention.

Next, referring to a flow chart shown in FIG. 7, an example of processing performed in the case of receiving data transmitted with such configuration at the HDMI terminal 41 of the projector apparatus 30 that is a sink device is explained. The processing is carried out using the configuration of a functional block shown in FIG. 4. First, it is determined whether a transmitted signal which is AVI information included in auxiliary data in this case can be received stably (step S11). Upon detecting AVI information, for example, a plurality of times (for example, two times) and if the information remains unchanged, it is determined that the receiving state is stale.

Subsequently, it is determined whether there is an input of pixel data constituting actual video data (step S12). Upon detecting the input of video data, it is determined whether the input video data is within a receivable frequency range (step S13). Here, whether the input data is video data having a frequency capable of being displayed on the projector apparatus 30 is determined using a clock frequency or the like.

In the case where the frequency of the video data is determined to be within the receivable range, information included in AVI information is extracted to detect the number of pixels of the transmitted video in the horizontal direction and the number of pixels of the transmitted video in the vertical direction. Further, a clock frequency (Dot Clock) generated based on transmitted pixel clock or the like is detected. The detected information is compared with a list of digital television signals (DTV signals), which is stored in the memory 37, capable of being displayed on the projector apparatus 30. If the signal having the number of pixels and frequency corresponds with an item in the list, it is determined that a DTV signal corresponding to the signal type is input (step S14). Although a specific detection example is later described, if the number of pixels (resolution) being the same, the signal is determined using the frequency. In the case of determining the input of a DTV signal, digital video data having a corresponding format is supplied to a circuit at a stage subsequent to the video data processing unit 44b shown in FIG. 4. Subsequently, the corresponding video is displayed (projected) on the video projection unit 33 shown in FIG. 3.

In the case where it is determined at step S12 that there is no input and in the case where it is determined at step S13 that the signal is in a frequency range incapable of being received, it is determined at step S14 that the signal may not be displayed. Accordingly, the video data is not output to a circuit at the stage subsequent to the video data processing unit 44b.

In the case where it is determined that there is the input at step S12, the signal is within the receivable frequency range at step S13, and there is no matching digital television signal (DTV signal) at step S14, it is determined whether the signal is a video signal (PC signal) for a monitor of a personal computer apparatus (step S15). In this case, video data formats for a PC signal capable of being displayed, which are stored in the memory 37, and the number of pixels of the video in the horizontal direction and the number of pixels of the video in the vertical direction which are included in the input signal, and the clock frequency which is generated based on the transmitted pixel clock and the like are compared. Video data stored in the memory 37 and having a low resolution (including a small number of pixels), for example, is used for the comparison. At that time, if the number of pixels is smaller than the number of pixels shown in a format stored in the memory 37 and the signal does not match other formats having a smaller number of pixels, the signal is determined as the signal of the format and the display processing is performed on the format. Accordingly, part of the prepared pixels is not displayed in that case, and video is displayed (projected) in the vicinity of the upper left corner, for example.

FIG. 8 is a diagram showing an example of the types of digital television signals (DTV signals) prepared in the memory 37. Even if the number of horizontal pixels and the number of vertical pixels are not exactly correspond with those described in the list, it is determined that the numbers of pixels match the numbers shown in the diagram in the case where values thereof are within a range of +2 from the numbers. The maximum value and the minimum value are set for the vertical frequency representing the frame frequency, and the signal is determined to be the corresponding type of signal in the case where the vertical frequency falls within the range.

For example, in the case where the number of horizontal pixels is 1,920; the number of vertical pixels is 540; and the vertical frequency is within the range of 55 Hz to 64 Hz as shown in the fifth row of FIG. 8, the signal is determined to be the signal type of 1080/60i and the display processing is set based on the signal type. If the vertical frequency is in the range of 46 Hz to 55 Hz with the same numbers of pixels, the signal is determined to be the signal type of 1080/50i. Thus, the type of input signal is immediately determined using data on the number of horizontal pixels, the number of vertical pixels and the like, which are transmitted from the source device, in the case where the digital television signal is input. It should be noted that the maximum vertical frequency in a part of signal types shown in the list of FIG. 8 is set to a frequency, such as 93 Hz, considerably higher than a normal vertical frequency. Accordingly, part of video signals for a computer monitor can also be applied.

FIG. 9 shows an example of the types of video signals (PC signals) for a monitor of a personal computer apparatus prepared in the memory 37, which is used for the determination at step S15 performed in the case where there has been no matching item in the list shown in FIG. 8. Here, processing is equivalent to the processing in the case of receiving the video data output from a DVI standard terminal at the HDMI terminal 41 of the projector apparatus 30. In the case where the number of horizontal pixels and the number of vertical pixels are equal to or less than the pixel values shown in FIG. 9 and the vertical frequency is within a predetermined range between the maximum value and minimum value, the signal type is determined to correspond with a video signal for a monitor of a personal computer. Moreover, in the case where the signal does not match any of the types shown in FIG. 9, such signal is treated as no signal.

An input signal system is thus determined. Accordingly, the type of an input signal is directly determined using data on the number of horizontal pixels (resolution) and the number of vertical pixels (resolution) which are transmitted from the source device and the frame frequency determined from the received data in the sink device. As a result, demodulation of actually received data and processing of counting the number of pixels, which may be necessary in related art, become unnecessary so that the type of the input data can be determined by quick and simplified processing.

It should be noted that the explanation is made regarding the HDMI standard interface in the above-described embodiment, however an embodiment of the present invention can also be applied to other similar transmission standards. Also, a projector apparatus projecting video to an external screen is applied as the sink device in the above-described embodiment, however the projector apparatus may be configured as a rear projector having a configuration in which video is projected from the rear side of the screen retained in the apparatus. As an alternative, an embodiment of the present invention may be applied to a video device such as the television receiver other than the projector apparatus.

It should be understood by those skilled in the art that various modifications, combinations, sub-combinations and alterations may occur depending on design requirements and other factors insofar as they are within the scope of the appended claims or the equivalents thereof.

The invention claimed is:

1. A video receiving apparatus including an input terminal to receive pixel-based video data transmitted with pixel clock synchronized with the video data, comprising:
   a separation unit configured to separate auxiliary data added to the video data from the video data obtained at the input terminal;
   an information acquisition unit configured to acquire information on the number of horizontal pixels and the number of vertical pixels for the input video data from the auxiliary data separated at the separation unit; and
   a determination unit configured to directly determine a type of the input video data by using the information on the number of horizontal pixels and the number of vertical pixels that is obtained at the information acquisition unit,
   wherein the determination unit accesses a database that cross-references numbers of horizontal pixels and numbers of vertical pixels to respective video types, and determines the type of the input video data by determining which of the video types in the database corresponds to the number of horizontal pixels and the number of vertical pixels for the input video data, and in the case that no video type in the database corresponds to the number of horizontal pixels and the number of vertical pixels for the input video data, the determination unit determines the type of the input video data by determining which of the video types in the database corresponds, within an acceptable margin of difference, to the number of horizontal pixels and the number of vertical pixels for the input video data.

2. A video receiving apparatus according to claim 1, wherein the determination unit detects a vertical frequency of the video based on the number of horizontal pixels, the number of vertical pixels and a frequency of pixel clock obtained at the input terminal, and determines the type of the input video data by using the vertical frequency, the number of horizontal pixels and the number of vertical pixels.

3. A video receiving apparatus according to claim 1, wherein the determination unit determines that the input video data is video data for a computer monitor, in the case where there is no corresponding type in data prepared in advance.

4. A video receiving apparatus according to claim 3, wherein the input video data is displayed as data, a type of which is selected from types of the number of horizontal pixels and number of vertical pixels prepared in advance as the types of video data for a computer monitor, in the case where the input video data is determined to be the video data for a computer monitor.

5. A method of receiving pixel-based transmitted video data and pixel clock synchronized with the video data at an input terminal, comprising:

separating auxiliary data added to the video data from the video data obtained at the input terminal;

acquiring information on the number of horizontal pixels and the number of vertical pixels for the input video data from the separated auxiliary data; and directly determining a type of the input video data by using the acquired information on the number of horizontal pixels and the number of vertical pixels, wherein directly determining comprises determining the type of the input video data by accessing a database that cross-references numbers of horizontal pixels and numbers of vertical pixels to respective video types, and determining which of the video types in the database corresponds to the number of horizontal pixels and the number of vertical pixels for the input video data, and in the case that no video type in the database corresponds to the number of horizontal pixels and the number of vertical pixels for the input video data, directly determining comprises determining which of the video types in the database corresponds, within an acceptable margin of difference, to the number of horizontal pixels and the number of vertical pixels for the input video data.

\* \* \* \* \*